Patented Apr. 28, 1942

2,281,436

UNITED STATES PATENT OFFICE 2,281,436

STABLE RUBBER HYDROCHLORIDE COMPOSITION

Albert Hershberger, Buffalo, N. Y., assignor to E. I. du Pont de Nemours & Company, Wilmington, Del., a corporation of Delaware No Drawing. Application December 1, 1939, Serial No. 307,082

8 Claims. (Cl. 260—735)

This invention relates to rubber hydrohalides, especially rubber hydrochloride. More particularly it relates to thin sheets of rubber hydrochloride which do not readily deteriorate.

Rubber readily adds hydrogen chloride to form a product called rubber hydrochloride.

Complete saturation with the hydrochloride is not necessary to produce a material distinctly different from rubber. Products containing 26%–34% chlorine are commercially available and important. These rubber hydrochlorides and the corresponding other rubber hydrohalides deteriorate rapidly upon aging, exposure to light and subjection to elevated temperatures.

This invention had for an object the preparation of rubber hydrohalide products, particularly rubber hydrochloride sheet wrapping materials which would not become brittle and/or fragile and/or dark-colored upon aging for long periods of time in the presence of air and/or upon subjection to elevated temperatures and/or upon exposure to light. The preparation of light, heat and age resistant rubber hydrochloride compositions suitable for sheets, continuous webs, filament solutions, coating compositions, molded articles and the like, constituted other objects. A general advance in the art, and other objects which will appear hereinafter, are also contemplated.

It has now been found that resistant rubber hydrochloride compositions and articles can be produced by stabilizing rubber hydrochloride with poly-ethylene-poly-amine long chain aliphatic acid salts.

The stabilizing effect of these materials is shown in the table following, in which a batch of rubber hydrochloride was divided into several parts and 10% (based on the weight of the rubber hydrochloride) of the stabilizing compound incorporated therein.

Table

| Stabilizer | Sun-lamp | Fadeometer (U. V. light) | Day-light | 65° C. dark |
|---|---|---|---|---|
|  | Hours | Hours | Days | Days |
| Blank (no stabilizer) | 40 | 36 | 30 | 15 |
| Triethylene tetramine monostearate | 66 | 72 | 93 | 62 |
| Triethylene tetramine distearate | 58 | 65 | 85 | 48 |
| Diethylene triamine mono palmitate | 65 | 75 | 90 | 65 |
| Tetra ethylene pentamine monolaurate | 71 | 80 | 100 | 65 |
| Triethylene tetramine mono oleate | 64 | 71 | 85 | 51 |

From the following description and specific examples, in which are disclosed certain embodiments of the invention as well as details of what is believed to be the best mode for carrying out the invention, it will be apparent how the foregoing objects and related ends are accomplished. The parts are given by weight throughout the application.

EXAMPLE I

A batch of rubber hydrochloride was prepared by adding dry hydrogen chloride to 15 minute milled pale crepe rubber in chloroform (a 5% solution). The product was precipitated with methanol and washed with methanol. It contained 30.5% chlorine. The product was dissolved in chloroform to form a 6% solution, to which was then added 10% (based on the weight of the rubber hydrochloride) of triethylene tetramine monostearate. Films were cast from the resulting clear solution on a chromium plated steel plate, and dried at about 40° C. The resulting films, after stripping from the plate, were approximately 0.001 of an inch thick, flexible, transparent and strong. The films were exposed to the action of ultra-violet light at a distance of about 8 inches for 72 hours, up to which time the film was found to have satisfactory flexibility. Strips of the film were also heated at 65° C. in the dark. Under such conditions they first showed embrittlement after 62 days. Films cast from some of the rubber hydrochloride solution to which no stabilizer had been added became embrittled after 15 days.

EXAMPLE II

To a 5% solution (in chloroform) of rubber hydrochloride there was added 10% (based on the weight of the rubber hydrochloride) of triethylene tetramine distearate. This stabilizer dissolved readily in the solution. The resulting rubber hydrochloride composition was found to be suitable for the preparation of coatings and self-supporting films. Such products retained their flexibility, tensile strength and toughness much longer than similar films prepared from the unmodified rubber hydrochloride.

Transparent, self-supporting films approximately 0.001 of an inch thick prepared from the above composition by solvent evaporation, retained in a large measure their flexibility, tensile strength and toughness for 12 weeks under ordinary room aging conditions and exposure to daylight. Corresponding films prepared from the unmodified rubber hydrochloride were weak and brittle after 4 weeks exposure under the same conditions. When exposed to a temperature of 65° C. in a dark oven, the films containing the triethylene tetramine distearate retained their excellent properties in a large measure for 48 days, whereas the films of the plain rubber hydrochloride failed after 15 days at the same temperature.

EXAMPLE III

To a 5% solution (in chloroform) of rubber hydrochloride, 8% (based on the weight of the rubber hydrochloride) of diethylene triamine monopalmitate was added. The stabilizer dissolved readily in the solution. The resulting rubber hydrochloride composition was found to be suitable for the preparation of films and coatings which are resistant to deterioration with age.

Transparent, self-supporting films approximately 0.001 of an inch thick, prepared from the above composition by solvent evaporation, retained in a large measure their flexibility, tensile strength and toughness for 75 hours' aging in a standard Fadeometer. Similar film from the unmodified rubber hydrochloride solution became quite brittle after 36 hours under the same conditions.

The amount of the polyalkylene-polyamine salt of the long chain aliphatic acid ordinarily used falls within the range 0.5% to 12%, based on the weight of the rubber hydrochloride. The intermediate range of 1% to 10%, and usually the still more specific range of 1% to 5%, has been found preferable. For special purposes more than 12% may be used.

The preferred stabilizers are diethylene triamine mono-myristate, diethylene triamine monostearate, diethylene triamine mono-palmite, diethylene triamine di-myristate, diethylene triamine distearate, triethylene tetramine monostearate, triethylene tetramine mono-palmitate, triethylene tetramine mono-oleate, triethylene tetramine mono-laurate, triethylene tetramine distearate, triethylene tetramine dilaurate, and tetraethylene pentamine mono-laurate.

The polyalkylene polyamines of the present invention are comprehended by the general formula:

NH$_2$(Q—NH)$_x$—H)

in which Q represents an alkylene group, and $x$ a positive integer greater than 1. In the case of the amines containing the ethylene radical, the sub-generic formula is:

NH$_2$—(CH$_2$CH$_2$NH)$_x$—H

The aliphatic acids employed contain 12 to 20 carbon atoms. Acids containing more than 20 carbon atoms are useful for special purposes.

The stabilizing compound may comprise one or more polyethylene polyamine radicals (residue, group, nucleus), and one or more aliphatic acid radicals. The stabilizers may be used singly or in combination.

The stabilizer may be introduced into the rubber hydrochloride composition in any suitable manner, for example, by the use of a neutral solvent, by milling, by grinding or kneading, and the like.

The rubber hydrochloride may be prepared by any of the various methods known to the art, for example, by the addition of gaseous hydrogen chloride to rubber dissolved in a chlorinated solvent, by the treatment of rubber with solutions of substantially anhydrous hydrogen chloride in a non-solvent for the rubber (ethyl acetate and the like), by the reaction of rubber with liquid substantially anhydrous hydrogen chloride at low temperatures (such as —80° C.), and the like.

The rubber hydrochloride employed preferably has a combined chlorine content of 28% to 32%, but comparable results are obtained with material whose chlorine content is within the range 26% to 34%.

Either amorphous or crystalline varieties, or mixtures of these varieties, may be employed. Mixtures of rubber hydrochlorides of different chlorine contents may be employed, for example, various production batches may be blended.

In the preparation of the compositions of this invention, it is preferable to employ a neutral rubber hydrochloride from which free hydrogen chloride (if any) has been removed by any suitable method, for example, by washing the rubber hydrochloride with methanol, by treatment of the rubber hydrochloride (which may be in solution) with basic material such as alkali carbonates, hydroxides, oxides and the like, alkaline earth carbonates, hydroxides, oxides and the like, with organic amines and the like, followed by removal of the basic material (and its salt).

One very desirable method for preparing the rubber hydrochloride is to saturate (at room temperature) a 3% solution (in chloroform) of 30 minute milled pale crepe rubber with dry hydrogen chloride, and to thereafter pass additional hydrogen chloride into the solution for 48 hours (with stirring). The resulting solution is then poured slowly into a large excess of methanol, whereby the rubber hydrochloride is precipitated. The product is then washed with methanol until the washings are neutral to bromthymol. For convenience in handling, the rubber hydrochloride may then be redissolved in chloroform to produce a 5% solution. The chlorine content of this rubber hydrochloride should be 30.5% to 31.5%.

The new compositions may also contain, in addition to the stabilizing material which curbs or restrains the deterioration, modifying agents such as natural resins, synthetic resins, waxes, wax substitutes, wax-like materials, wax blending agents, oils, drying oils, driers, fats, antisticking agents, slip agents, pigments, metallic powders, fillers, dyes, plasticizers, etc. Minor proportions of other film forming materials and stabilizers, singly or in combination, may be employed.

Compositions of glass-clear transparency can readily be prepared according to this invention, because of the excellent solubility and compatibility of the stabilizers. The stabilizers cause no substantial change in the film-forming properties of the rubber hydrochloride, and may, for this reason, be used in larger amounts (if this is desirable considering the specific purpose to which the composition is to be put) than stabilizers heretofore proposed in the art. An additional advantage for compositions of this invention resides in the fact that the stabilizers do not evaporate from the compositions. As a result, the compositions retain their resistance to light and heat over long periods of time, a characteristic heretofore unknown because the only organic stabilizers considered suitable for rubber hydrohalides were volatile or resinous.

The multitude of uses for rubber hydrochloride are well known to the art, and need not be repeated here. The compositions of the present invention are especially suited for the preparation of thin (that is, on the order of a few tenthousandths to a few hundredths of an inch in thickness) sheet material, particularly transparent, self-supporting films which are highly durable, tear resistant, and water resistant.

As many apparently widely different embodiments of this invention may be made without departing from the spirit and scope thereof, it is to be understood that this invention is not limited to the specific embodiments thereof except as defined in the appended claims.

I claim:

1. A composition of matter which includes a rubber hydrohalide and 0.5% to 12% polyethylene polyamine aliphatic acid salt based on the rubber hydrohalide, said amine containing 2 to 5 nitrogen atoms and said aliphatic acid having 12 to 20 carbon atoms.

2. A composition of matter which includes a rubber hydrohalide and 0.5% to 12% aliphatic acid salt of a chemical compound of the formula:

$$NH_2-(CH_2CH_2NH)_x-H$$

in which $x$ is a positive integer greater than 1 and less than 5 and the aliphatic acid has 12 to 20 carbon atoms, the amount of the said salt being based on the rubber hydrohalide.

3. A composition consisting essentially of rubber hydrochloride of 26%–34% chlorine content together with at least 0.5% (based on the rubber hydrochloride) of an aliphatic acid salt of triethylene tetramine, said aliphatic acid having 12 to 20 carbon atoms.

4. Sheet wrapping material comprising essentially rubber hydrochloride of 26%–34% chlorine content and 10% (based on the weight of the rubber hydrochloride) triethylene tetramine mono-stearate.

5. A composition consisting essentially of rubber hydrochloride of 26%–34% chlorine content together with 0.5% to 12%, based on the rubber hydrochloride, of an aliphatic acid salt of a chemical compound of the formula $$NH_2-(CH_2CH_2NH)_x-H$$

in which $x$ is a positive integer greater than 1 and less than 5 and the aliphatic acid has 12 to 20 carbon atoms.

6. A composition consisting essentially of rubber hydrochloride of 28%–32% chlorine content together with 0.5% to 12%, based on the rubber hydrochloride, of an aliphatic acid salt of a chemical compound of the formula $$NH_2-(CH_2CH_2NH)_x-H$$

in which $x$ is a positive integer greater than 1 and less than 5 and the aliphatic acid has 12 to 20 carbon atoms.

7. Sheet wrapping material comprising essentially rubber hydrochloride of 26%–34% chlorine content and 0.5%–12% (based on the weight of the rubber hydrochloride) diethylene triamine aliphatic acid salt, said aliphatic acid having 12 to 20 carbon atoms.

8. Sheet wrapping material comprising essentially rubber hydrochloride of 26%–34% chlorine content and 0.5%–12% (based on the weight of the rubber hydrochloride) tetraethylene pentamine aliphatic acid salt, said aliphatic acid having 12 to 20 carbon atoms.

ALBERT HERSHBERGER.